(12) United States Patent
Murphy et al.

(10) Patent No.: US 7,024,172 B1
(45) Date of Patent: Apr. 4, 2006

(54) DIRECT CONVERSION RECEIVER USING A DITHERED LOCAL OSCILLATOR TO MITIGATE ADJACENT CHANNEL COHERENT INTERFERENCE

(75) Inventors: Patrick J. Murphy, Cedar Rapids, IA (US); Gunther B. Frank, Cedar Rapids, IA (US); Dennis Hoffman, Cedar Rapids, IA (US); Carlos J. Chavez, Marion, IA (US)

(73) Assignee: Rockwell Collins, inc., Cedar Rapids, IA (US)

( * ) Notice: Subject to any disclaimer, the term of this patent is extended or adjusted under 35 U.S.C. 154(b) by 946 days.

(21) Appl. No.: 09/883,016

(22) Filed: Jun. 15, 2001

(51) Int. Cl.
*H04M 1/00* (2006.01)

(52) U.S. Cl. .................. 455/324; 455/313; 455/323
(58) Field of Classification Search .............. 455/324, 455/323, 313
See application file for complete search history.

(56) References Cited

U.S. PATENT DOCUMENTS

| | | | |
|---|---|---|---|
| 4,944,025 A | 7/1990 | Gehring et al. ............. 455/207 |
| 5,230,099 A | 7/1993 | Loper .......................... 455/324 |
| 5,604,929 A | 2/1997 | Loper et al. ................. 455/324 |
| 6,061,574 A * | 5/2000 | Goldberg ..................... 455/503 |
| 6,088,573 A * | 7/2000 | Tsuda ........................ 455/13.4 |
| 6,775,528 B1 * | 8/2004 | Bedgedjian ................. 455/260 |

* cited by examiner

*Primary Examiner*—Bing Q. Bui
*Assistant Examiner*—Rasha S. Al-Aubaidi
(74) *Attorney, Agent, or Firm*—Nathan O. Jensen; Kyle Eppele

(57) ABSTRACT

A direct conversion quadrature receiver and method are provided according to the invention. The receiver according to one embodiment includes a primary local oscillator (LO) that down-converts a received RF signal to a quadrature intermediate frequency (IF) signal. The receiver further includes a dithering controller responsive to the quadrature IF signal generated by the primary LO. The dithering controller communicates a feedback signal back to the primary LO. The feedback signal controls the primary LO in order to offset down-conversion of the RF signal by the quadrature IF signal. The dithering controller offsets the primary LO from a zero-IF signal in order to reduce a phase and gain error of the quadrature IF signal.

14 Claims, 14 Drawing Sheets

DIRECT CONVERSION RECEIVER USING A DITHERED LOCAL OSCILLATOR TO MITIGATE ADJACENT CHANNEL COHERENT INTERFERENCE

FIELD OF THE INVENTION

The present invention relates generally to a direct conversion radio frequency communication receiver, and more particularly to a method and apparatus for reducing errors in a direct conversion receiver.

BACKGROUND OF THE INVENTION

Modern communications employs many types of radio frequency transmitters and receivers. One type of radio frequency receiver is a direct conversion receiver. In a direct conversion receiver a received signal is mixed directly to a zero-intermediate frequency (IF), wherein the data encoded in the received signal is directly demodulated. The advantages of a direct conversion receiver are that it requires less circuitry, requires less complex circuitry, and produces a cheaper receiver due to the need for fewer components.

FIG. 1 shows a desired channel B that exists in the frequency spectrum. The desired channel B may exist along with adjacent channels A and C. It is desired that a receiver be able to receive and demodulate the information in signal B, but yet without receiving or demodulating any signal from channels A and C.

FIG. 2 shows a down-conversion of the desired channel B to a zero-IF frequency, wherein the down-converted channel B is now centered at zero Hertz (i.e., the carrier wave has been completely removed). The adjacent channel A and the adjacent channel C can be removed by a low pass filtering (represented by the dashed line). This leaves the channel B to be demodulated. Advantageously, the zero-IF down-conversion and low pass filtering eliminate any positive or negative image frequencies.

However, a problem with a direct conversion receiver of the prior art is that several anomalies may occur in the signal due to the down-conversion process. One anomaly is a DC bias in the down-converted signal. Another anomaly is an amplitude modulation (AM) notching effect that is created whenever the AM carrier is removed. Yet another anomaly is an AM sideband notching that occurs when any sideband energy of the AM signal falls at zero Hertz and the In-phase and Quadrature (I/Q) channel DC offset errors have been measured and removed. In addition, other down-conversion anomalies may include frequency modulation (FM) notching, microphonics (i.e., errors induced due to the physical motion of the receiver), synthesizer 1/f noise, and phase and gain errors.

FIG. 3 is a block diagram of a quadrature direct conversion receiver. The receiver includes two local oscillators (LO) 303$i$ and 303$q$ for down-converting the I/Q components of a received signal. These two LOs 303$i$ and 303$q$ are generally depicted as a single analog mixer. Phase and gain errors in such a receiver are commonly a combination of phase and gain errors between the I and Q components in the LOs 303$i$ and 303$q$ respectively and a mismatch in the analog baseband circuitry (the phase and gain errors are referenced relative to the I channel). In the mixer portion of the receiver, the theta ($\theta$) term in the Q channel is a phase error term that is present due to the mismatch in time delay between the two LOs 303$i$ and 303$q$ (i.e., they may not be perfectly ninety degrees apart). The $G_O$ term in the Q channel is a gain error term that is present due to the power mismatch between the two LOs (i.e., the power in each oscillator is not identical). There is also a phase and gain error contribution from the baseband analog portion of the receiver. The low pass filters (LPFs) 305$i$ and 305$q$ generally cannot be perfectly matched, and will contribute a gain error term and a phase error term. Moreover, the attenuators 308$i$ and 308$q$ and the baseband gain 309$i$ and 309$q$ are not perfectly matched, and will also create a gain error term. As a result, the phase error term will be frequency dependent and will change across frequency. Furthermore, the phase and gain errors will change across temperature. Therefore, the phase and gain errors may be continually changing, and need to be continuously calculated in order to be corrected.

Attempts have been made in the prior art to address these anomalies by using a phase/gain error correction algorithm in conjunction with a zero-IF frequency down-conversion. One such phase/gain error detection and correction method employs rotating vectors and is disclosed in Loper, U.S. Pat. No. 5,230,099, and also in Loper et al., U.S. Pat. No. 5,604,929, both of which are incorporated herein by reference. However, one significant drawback of a zero-IF conversion is that phase/gain error correction methods known in the art cannot be used at zero Hertz. The rotating vector error correction method performs well when calibrating the phase and gain errors with an adjacent channel interferer present, but a new problem is created when there is an adjacent channel spectrally coherent interferer. The rotating vector phase and gain correction cannot perform phase and gain error calculations and corrections if there is an adjacent channel interferer that is a coherent spectral image of the desired channel. This arises because a coherent interferer's I/Q vector rotates in the opposite direction from the desired channel's I/Q vector and adds to the desired channel's image, and the desired channel adds to the interferer's image, creating a perceived receiver phase and gain error that is incorrect. In addition, a coherent interferer notching effect can be created. The AM notching effect, the AM sideband notching effect, and the FM notching effect phenomena's can be created at the IF when the interferer has a discrete spectral line that is a frequency coherent image of a spectral line in the desired band. The adjacent channel interferer does not need to be a perfectly (phase and frequency) coherent image of the desired channel signal in order to create problems for the rotating vector phase and gain error correction. It only needs to be frequency coherent, because this phenomena is primarily a discrete spectral line issue.

The phase/gain error correction problem has been addressed in the prior art by tuning the LO off of the zero-IF frequency to produce essentially a baseband signal. However, as a consequence, an adjacent channel interferer may now be a positive/negative image frequency, and notching can occur at this IF.

FIG. 4 shows a down-conversion of the desired channel B to a baseband positive IF frequency that is not centered at zero Hertz. Typically, a down-converted baseband signal extends from zero Hertz to the upper limit of the radio frequency (RF) channel. The adjacent channel C may be removed through a low pass filter (again represented by a dashed line). Because adjacent channel A has been down-converted to a negative image frequency, it may still exist and may still interfere with the desired channel B.

FIG. 5 shows a down-conversion of the desired channel B to a baseband negative IF frequency. The adjacent channel A may be removed by a low pass filtering (again represented by a dashed line). However, the adjacent channel interferer C remains. It should be understood that when channel A or C remains, there remains a potential for this adjacent channel to become an adjacent channel interferer and interfere with the signal of channel B. The adjacent channel interferer may contribute to the aforementioned down-conversion anomalies.

Phase and gain errors in a quadrature direct conversion non-zero-IF receiver create an image frequency that adds distortion to the baseband demodulated AM/FM or I/Q. The result is that a direct conversion receiver according to the prior art is subject to an either/or situation. A great advantage of a quadrature zero-IF direct conversion is that no positive or negative image frequencies are created if the carrier is mixed down to exactly zero Hertz. However, the known phase/gain error correction methods do not function for a zero-IF system.

What is needed, therefore, are improvements in direct conversion receivers in order to eliminate anomalies in a down-converted signal.

SUMMARY OF THE INVENTION

A direct conversion quadrature receiver is provided according to one embodiment of the invention. The receiver comprises a primary local oscillator (LO) that down-converts a received radio frequency (RF) signal to a quadrature intermediate frequency (IF) signal. The receiver further comprises a dithering controller responsive to the quadrature IF signal generated by the primary LO. The dithering controller communicates a feedback signal back to the primary LO. The feedback signal controls an oscillation frequency of the primary LO in order to offset the quadrature IF signal. The dithering controller offsets down-conversion of the RF signal by the primary LO from a zero-IF signal in order to reduce a phase and gain error of the quadrature IF signal.

According to another embodiment of the invention, the receiver comprises a primary LO that down-converts a received RF signal to a quadrature IF signal. The receiver further comprises a dithering controller responsive to the quadrature IF signal generated by the primary LO. The dithering controller communicates a feedback signal back to the primary LO. The feedback signal controls an oscillation frequency of the primary LO in order to offset the quadrature IF signal. The receiver further comprises a phase and gain error measurement apparatus that measures a phase and gain error of the quadrature IF signal and generates a phase and gain error signal. The dithering controller offsets down-conversion of the RF signal by the primary LO from a zero-IF based on the phase and gain error signal.

A method of offsetting a primary LO in a direct conversion quadrature receiver is provided according to yet another embodiment of the invention. The method comprises the steps of generating a quadrature IF signal and offsetting the primary LO from a zero-IF to produce an offset quadrature IF signal.

The above and other features and advantages of the present invention will be further understood from the following description of the preferred embodiments thereof, taken in conjunction with the accompanying drawings.

DETAILED DESCRIPTION

Figure 6:
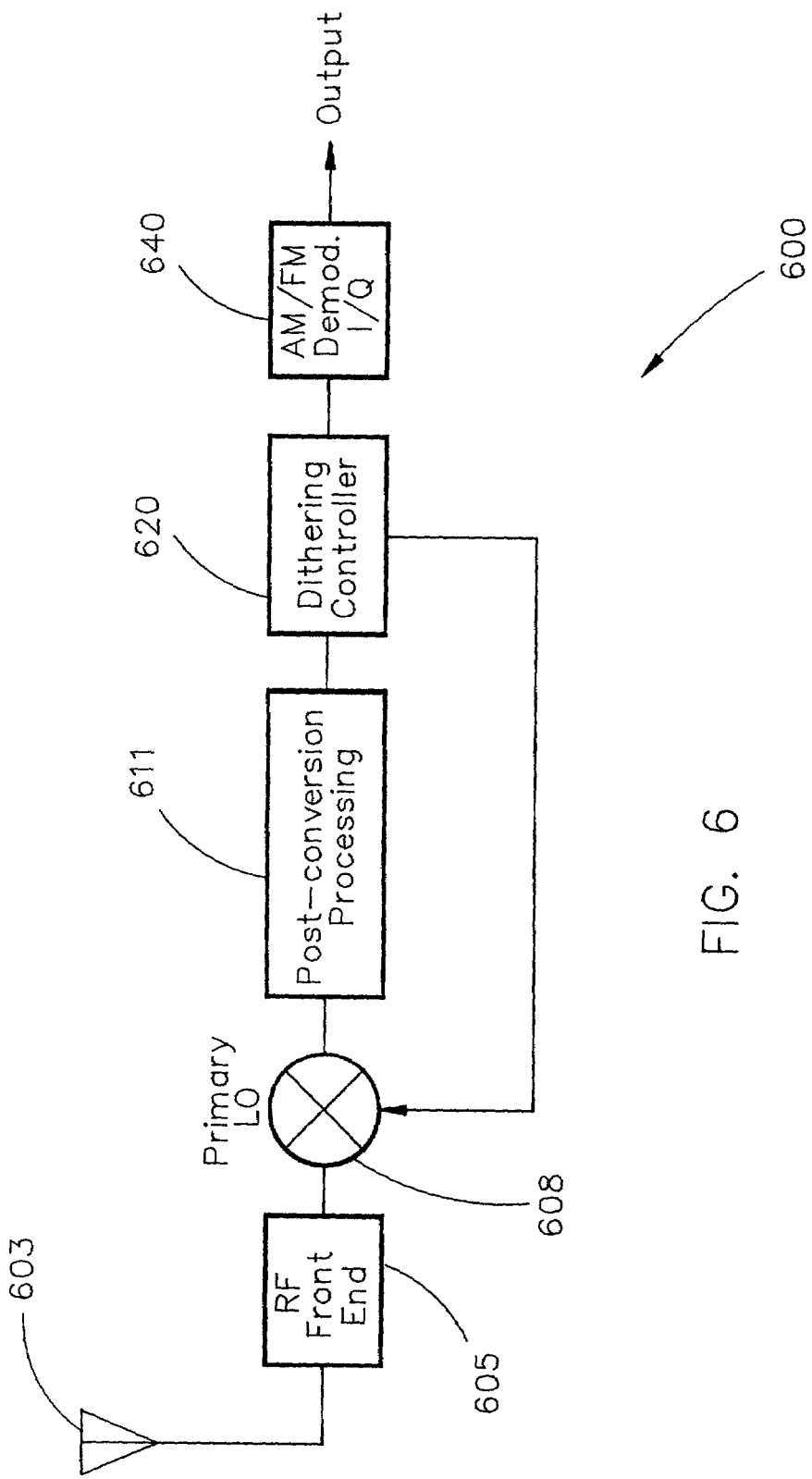
FIG. 6 is a block diagram of a direct conversion receiver according to one embodiment of the invention.

FIG. 6 is a block diagram of a direct conversion receiver 600 according to one embodiment of the invention. The direction conversion receiver 600 includes an antenna 603, a radio frequency (RF) front end 605, a primary local oscillator (LO) 608, a post-conversion processing block 611, a dithering controller 620, and an amplitude modulation (AM)/frequency modulation (FM) demodulator has In-phase and Quadrature (I/Q) block 640. The receiver 600 may be any direct conversion receiver that has In-phase and Quadrature (I and Q) channels.

The antenna 603 receives a radio frequency signal and provides it to the RF front end 605. The RF front end 605 may perform any known type of signal processing and conditioning, including filtering, pre-amplification, etc. The primary local oscillator 608 down-converts the received signal to zero Hertz. The down-conversion produces a de-modulated data stream of the data that was modulated onto the carrier wave for transmission. The post-conversion processing block 611 receives the de-modulated data stream and performs post-modulation processing such as amplification, filtering, analog to digital (A/D) conversion, decimation, etc. The AM/FM demodulator I/Q block 640 receives the de-modulated data signal and processes the data therein. The AM/FM demodulator I/Q block 640 may include a baseband digital gain, signal processing, automatic or manual gain control, etc.

Although the receiver 600 is referred to as a direct conversion receiver, it should be understood that the primary LO 608 does not necessarily have to down-convert the received signal to exactly zero Hertz. For purposes of this description, a direct conversion receiver refers to any receiver that down-converts a desired channel to a frequency less than the channel bandwidth.

Figure 1:
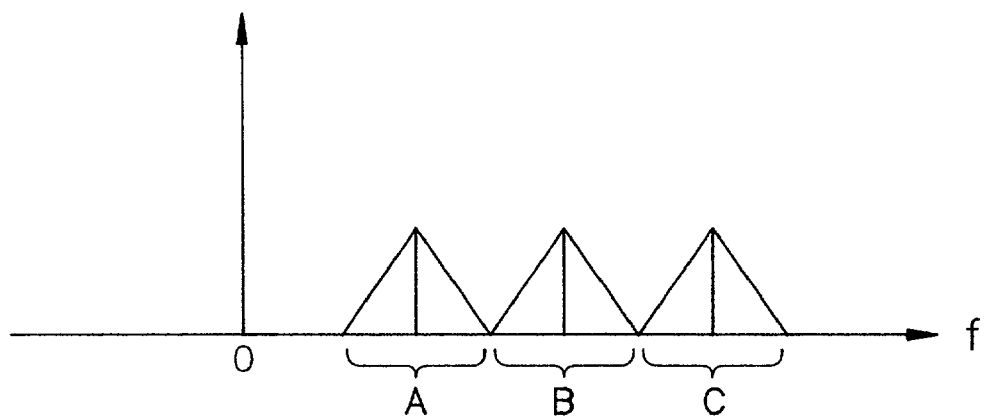
FIG. 1 shows a desired channel B that exists in the frequency spectrum.
Figure 2:
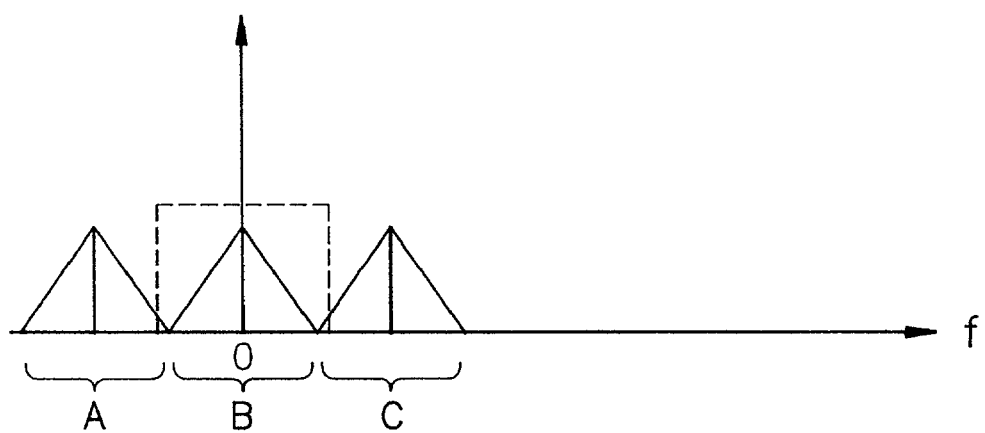
FIG. 2 shows a down-conversion of the desired channel B to a zero-IF frequency, wherein the down-converted channel B is now centered at zero Hertz.
Figure 3:
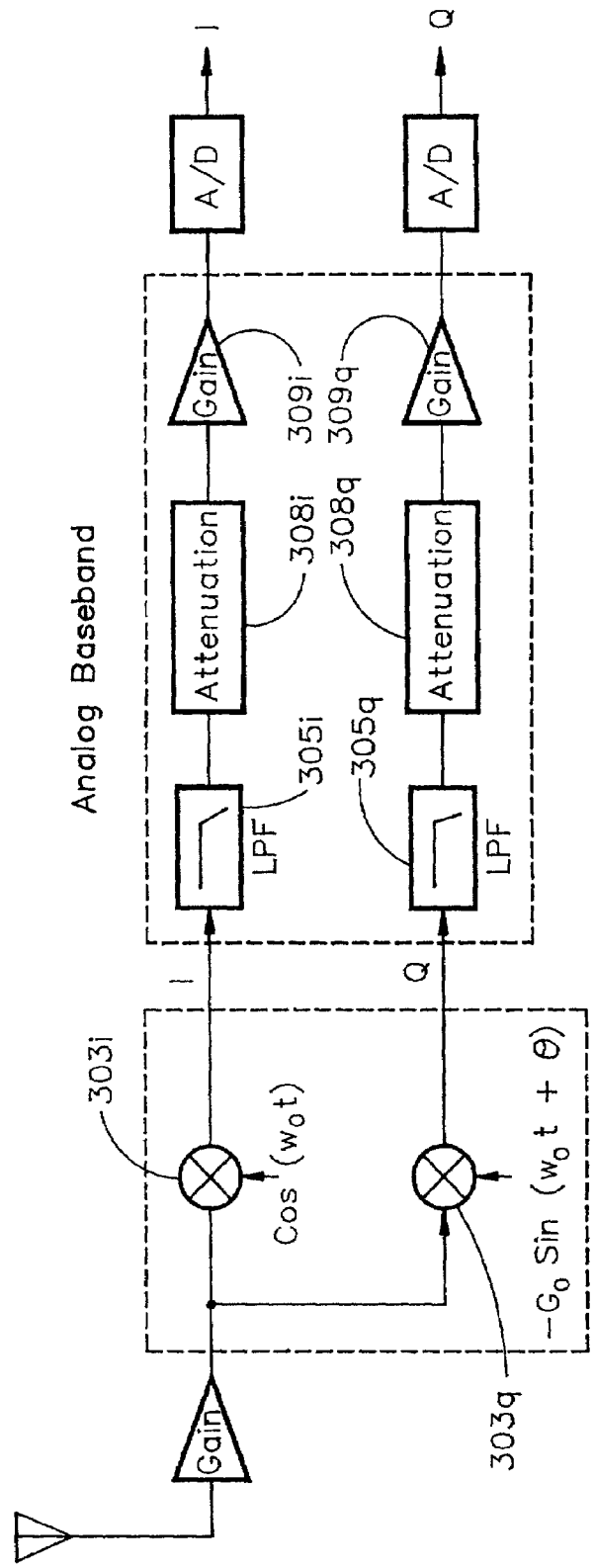
FIG. 3 is a block diagram of a quadrature direct conversion receiver.
Figure 4:
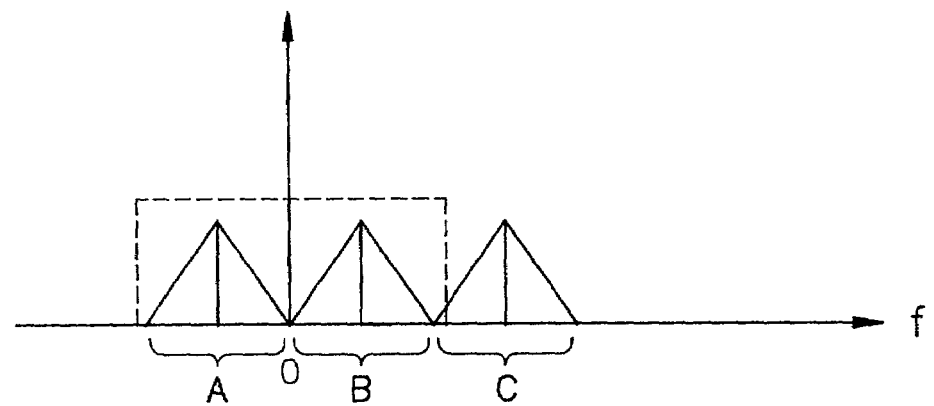
FIG. 4 shows a down-conversion of the desired channel B to a baseband positive IF frequency.
Figure 5:
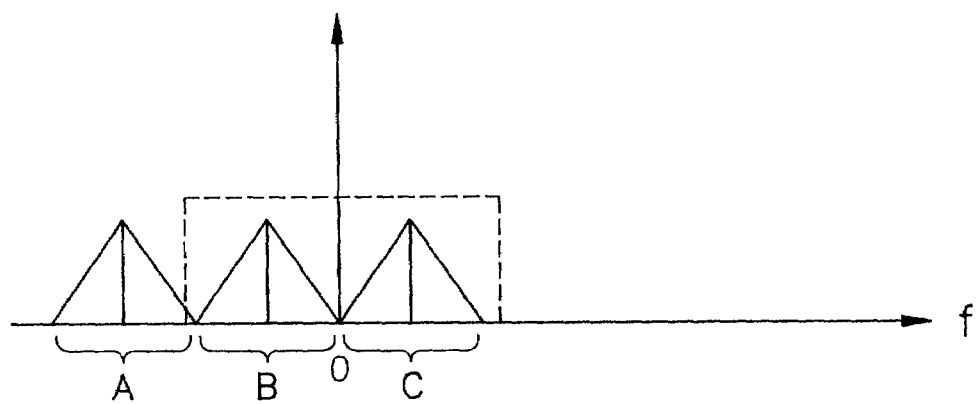
FIG. 5 shows a down-conversion of the desired channel B to a baseband negative IF frequency.

In the receiver 600 according to the invention, the desired channel's image frequency may fall in the negative frequency band or in the potential interferer band (see FIG. 4). Simultaneously, a potential interferer's image frequency falls in the positive frequency band or in the desired channel's band. Therefore, the purpose of performing a phase and gain error correction is to eliminate an adjacent channel interferer's image distortion that falls on top of the desired channel in the positive portion of the frequency spectrum. Eliminating the interfering channel's image frequency is desired because such image frequency can de-sensitize the receiver and cause distortion in the baseband de-modulated AM, FM, or I/Q signal.

The dithering controller 620 controls the primary LO 608 and is capable of offsetting the primary LO 608 from a zero-IF down-conversion, according to the invention. The dithering controller 620 feeds a control signal back to the primary LO 608 and therefore controls the frequency of the primary LO 608. The dithering controller 620 is capable of controlling the primary LO 608 to down-convert the received signal to a zero-IF or to down-convert it to a non-zero-IF frequency, such as to a baseband-IF, for example.

The term "offset" as used herein refers to any change of frequency by the primary LO 608 from a steady-state carrier wave mixing. In a receiver according to the prior art, the down-conversion of a received signal is done using a constant mixing frequency. For example, if the received signal employs a modulated 1 MHz carrier wave, the prior art direct conversion receiver mixes in a constant, steady 1 MHz reference signal in order to down-convert the received signal directly to a zero-IF.

However, according to the offsetting of the present invention, the primary LO 608 does not necessarily mix a constant reference signal with the received signal. The offsetting may offset the resultant IF from the primary LO 608, resulting in a non-zero-IF. This necessitates another mixing step in the receiver 600 in order to ultimately achieve a zero-IF and recover the modulated information in the received signal.

The offsetting may include stepping the primary LO 608 away from a zero-IF reference signal by a step amount (i.e., mixing in a 0.998 MHz reference signal with a 1 MHz carrier wave signal, for example). Stepping as used herein means that the primary LO 608 is changed by a frequency step, and is not changed on a time basis but is only changed when the receiver 600 determines that a spectrally coherent adjacent channel interferer exists. The stepping may be done periodically or may be done as needed, and the primary LO 608 therefore may remain essentially constant over long periods of time. Alternatively, the offsetting may perform a repeated stepping at predetermined intervals, termed dithering. Dithering as used herein means that the primary LO 608 is repeatedly changed in frequency at relatively quick intervals. The frequency changes are performed at predetermined time intervals, regardless of the need for a frequency value change. The dithering may vary (or hop) the reference signal over a pattern of offset frequencies, i.e., a hop sequence. Each frequency within the hop sequence may be referred to as a hop frequency or a hop dwell.

The operation of the direct-conversion receiver 600 includes receiving a desired signal and down-converting the signal to a zero-IF or near zero-IF frequency. The dithering controller 620 controls the down-conversion by feeding a tuning word or command back to the primary LO 608. The dithering controller 620 can change the LO frequency up to about the carrier frequency minus one-half of the RF bandwidth. Alternatively, the dithering controller 620 may change the LO frequency up to about the carrier wave frequency minus one-half of the information modulation bandwidth (the information modulation onto the carrier wave must remain in the positive frequency domain). The receiver 600 may mix the desired channel to a zero Hertz IF or to either the positive or negative frequency band.

The action of frequency shift keying (FSK) dithering the primary LO 608 has the effect of spreading the carrier and sideband energy such that the desired carrier and sidebands and adjacent channel interferer can never be on the same image frequency at the same time. The required hop distance is small, just what is required to prevent frequency coherency, and the FSK hop sequence can be repeated every calibration cycle, for example.

Depending on where the interferer is located in the frequency domain, mathematically it can be shown that the interferer can only be an image frequency coherent with 1 FSK dwell or hop frequency when a minimum of 2 FSK dwell frequencies are used. This is an accurate statement when the assumption is made that the interferer is not a complex energy signal. If the interferer has energy at more than 1 discrete spectral point, for example a comb spectrum, then more FSK hops will be required per hop sequence. This is necessary in order to reduce the probability of having more than 1 FSK dwell per hop sequence where the desired channel's carrier or sideband and interferer are frequency coherent images of each other.

The direct conversion receiver 600 may operate in at least two modes. The first mode is a dithered/frequency-hopped zero-IF mode, wherein the frequency-hopped down-conversion is centered about a zero-IF. The second mode is a dithered/frequency-hopped baseband-IF mode, wherein the frequency-hopped down-conversion is centered about a non-zero-IF.

When the primary LO 608 is stepped or dithered, the receiver 600 can at least partially mitigate the DC bias error, the AM carrier notching effect, the AM side band notching effect, and the FM notching effect. In addition, in a baseband-IF receiver, the baseband IF may mitigate the microphonics effects and the synthesizer 1/F noise.

The offsetting according to the invention may also improve the noise figure of the receiver 600. The noise figure may be improved because the synthesizer 1/f noise, any residual DC offset error in the I and Q channels, and any image distortion due to residual phase and gain errors are mixed out of band after the final complex mix to zero Hertz. The I/Q channelization filters 822 (see FIG. 8) filter off the 1/f noise, the residual DC offset error, and any image distortion that have not been already removed. The improvement in the noise figure may depend on the design and qualities of the receiver, and may be improved by as much as about 5 dB.

In addition, the baseband-IF mode can improve the phase/gain error measurement and the phase/gain error removal when the receiver 600 employs a rotating vector phase/gain error correction algorithm. The dithering reduces the phase/gain error by offsetting the primary LO 608 from a zero-IF frequency in order to employ a rotating vector phase/gain error correction algorithm. The dithering controller 620 generates a variable offset for the primary LO 608 and spreads the carrier modulation energy. As a result, the receiver 600 substantially achieves the benefit of a non-zero-IF direct conversion receiver while yet substantially retaining the benefits of a zero-IF receiver.

In the zero-IF mode, the dithering of the primary LO 608 is centered about a zero Hertz IF. Therefore, the receiver 600 employs a zero-IF around which the frequency is hopped. This is done in order to achieve an approximation of a zero-IF situation, i.e., to achieve the benefits of both a zero-IF down-conversion and to also gain an improvement in phase/gain error detection and correction by offsetting the primary LO 608 from the zero-IF.

In one example, for a carrier frequency $f_C=1.0$ MHz, the IF may be hopped over five IF frequencies, with each IF frequency being used for a period of several milliseconds, as shown in Table 1 below. The result is a sawtooth frequency pattern, where $f_{LO}$ is the original frequency of the primary LO 608 and therefore $f_{IF}=f_C-f_{LO}$=zero Hertz when the hop frequency $f_{HOP}$ is zero Hertz.

TABLE 1

| $f_{LO}$ | $f_{HOP}$ | New $f_{LO}$ |
| --- | --- | --- |
| 1.0 MHz | −153 Hz | 0.999847 MHz |
| 1.0 MHz | 0 Hz | 1.000000 MHz |
| 1.0 MHz | 153 Hz | 1.000153 MHz |
| 1.0 MHz | 30 Hz | 1.000030 MHz |
| 1.0 MHz | −30 Hz | 0.999970 MHz |

The above example is not limiting and is given merely to illustrate one possible hop frequency pattern. The pattern, the dwell times, the number of frequencies, etc., may be varied according to a desired receiver complexity, a required computational time, a desired phase/gain error correction accuracy, etc. It should be understood that a larger number of hop frequencies will produce a more efficient phase/gain error correction but will require more system resources and result in more system complexity.

In an alternative embodiment, the primary LO 608 may be normally maintained at a zero-IF and may be momentarily offset from the zero-IF to address the AM and FM notching effects and the AM sideband notching effect. The momentary offset may temporarily incur at least some of the previously discussed down-conversion anomalies in exchange for the benefit of an improved phase/gain error correction on an as-needed basis.

Alternatively, the dithering controller 620 may control the primary LO 608 of the direct conversion receiver 600 to achieve a non-zero, i.e., baseband-IF mode. When the primary LO 608 is dithered, the frequency hopping is centered about a non-zero-IF in order to achieve a satisfactory phase/gain error correction while minimizing the anomalies associated with a non-zero-IF.

When the dithering controller 620 is used to create a plurality of hop frequencies for the primary LO 608, the phase/gain error may be most efficiently corrected. In one embodiment, the dithering controller 620 controls the primary LO 608 to hop the IF between a plurality of frequencies in a repeating pattern. As in the zero-IF mode, the IF may be hopped over a plurality of IF frequencies. One example of hop frequencies for a non-zero-IF mode is shown in Table 2 below. Again, the result is a sawtooth offset profile where $f_{IF}=f_C-f_{LO}=16$ KHz when the hop frequency $f_{HOP}$ is zero Hertz (i.e., the primary LO 608 is offset by a baseband value).

TABLE 2

| $f_{LO}$ | $f_{HOP}$ | New $f_{LO}$ |
| --- | --- | --- |
| 984.0 KHz | −153 Hz | 983.847 KHz |
| 984.0 KHz | 0 Hz | 984.000 KHz |
| 984.0 KHz | 153 Hz | 984.153 KHz |
| 984.0 KHz | 30 Hz | 984.030 KHz |
| 984.0 KHz | −30 Hz | 983.970 KHz |

For each hop frequency of a dithering sequence, whether in the zero-IF mode or the non-zero-IF mode, the direct conversion receiver 600 generates phase and gain error coefficients $K_1$ and $K_2$. The phase and gain error coefficients $K_1$ and $K_2$ may be used to correct or mitigate the phase and gain error.

Generation of phase and gain error coefficients is known in the art. A rotating vector phase and gain measurement is shown in the previously mentioned patents to Loper, for example. According to the phase and gain error algorithm of Loper, the dci and dcq values (i.e., the I and Q error measurements) are obtained for the quadrature IF. Multiple dci and dcq values may be obtained and averaged to generate a pair of phase and gain error correction coefficients $K_1$ and $K_2$. The phase and gain error correction coefficients $K_1$ and K2 represent a measurement of the existing phase and gain error, and therefore may be used to correct or mitigate the phase and gain error in the receiver 600.

According to one embodiment of the invention, the direct conversion receiver 600 may cycle through one complete frequency hop cycle and then use the accumulated dci and dcq values obtained for each hop frequency to generate the phase and gain error coefficients $K_1$ and $K_2$. The invention may use an average of the dci and dcq values to correct the phase and gain error.

The dithering of the invention applies additional steps to the phase and gain error correction in order to improve the phase/gain error correction. In one embodiment, a most divergent hop frequency from the phase and gain error average is found. This may include comparing each dci and dcq pair to the average, with the dci and dcq pair that is farthest from the average being the divergent or outlier dci and dcq pair. In order to improve the phase and gain error of the receiver 600, the divergent pair may be removed from the average value and therefore not used in the error correction. The average may then be re-calculated and used to correct or mitigate the phase and gain error.

Figure 7:
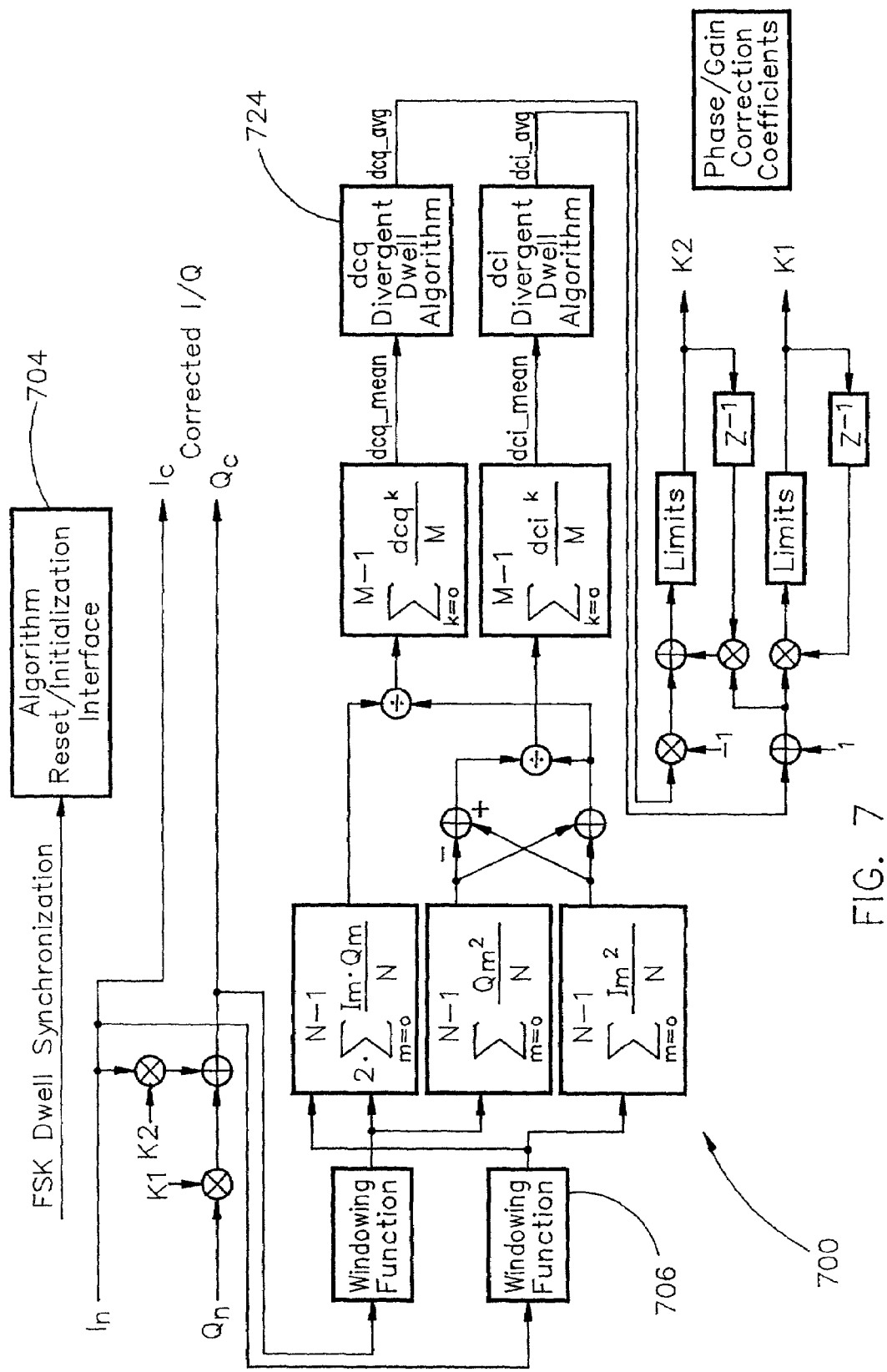
FIG. 7 is a block diagram of a phase and gain error correction calculation algorithm according to one embodiment of the invention.

FIG. 7 is a block diagram of a phase and gain error correction calculation algorithm 700 according to an embodiment of the invention. The phase and gain error correction algorithm 700 may include a reset/initialization interface 704, a windowing function 706, and a divergent dwell block 724. The basic phase and gain correction algorithm 700 shown is a modification of the phase and gain error correction algorithm given in the two patents to Loper.

The reset/initialization interface 704 receives a FSK dwell synchronization input that resets the phase and gain error correction algorithm 700 at the beginning of each hop sequence. The reset/initialization interface 704 provides a reset to the windowing function 706 and to the divergent dwell block 724.

The windowing function 706 captures portions of the I/Q signals during each frequency hop. A subsequent part of the algorithm calculates the phase and gain error values dci and dcq for each hop frequency using the rotating vector method, and summarizes the dci and dcq values to create a phase and gain error average.

The divergent dwell block 724 compares the dci and dcq pairs to the average and finds outlier dci and dcq values. The outliers are eliminated to produce the final I/Q average values that are used to calculate the $K_1$ and $K_2$ correction coefficients for correcting the phase and gain errors. The final $K_1$ and $K_2$ phase and gain error coefficients (shown) therefore are calculated without the outlier dci and dcq values.

In one optional embodiment, the hop frequency that produced the divergent error coefficient pair may be removed. Therefore, if a particular hop frequency is suffering from adjacent channel interference, the direct conversion receiver 600 may identify and remove a problematic hop frequency in order to improve the phase/gain error correction process.

The frequency hopping according to the invention may be controlled in several ways and may be controlled through a programmed internal table or other stored values that determine the frequency of each frequency hop and the time at each hop frequency. The frequency hopping may also be controlled by a received PN sequence included in a demodulated data, or may be controlled by a random numbered generator included within the direct conversion receiver 600. Alternatively, it may be done according to some other selection algorithm as desired.

Figure 8:
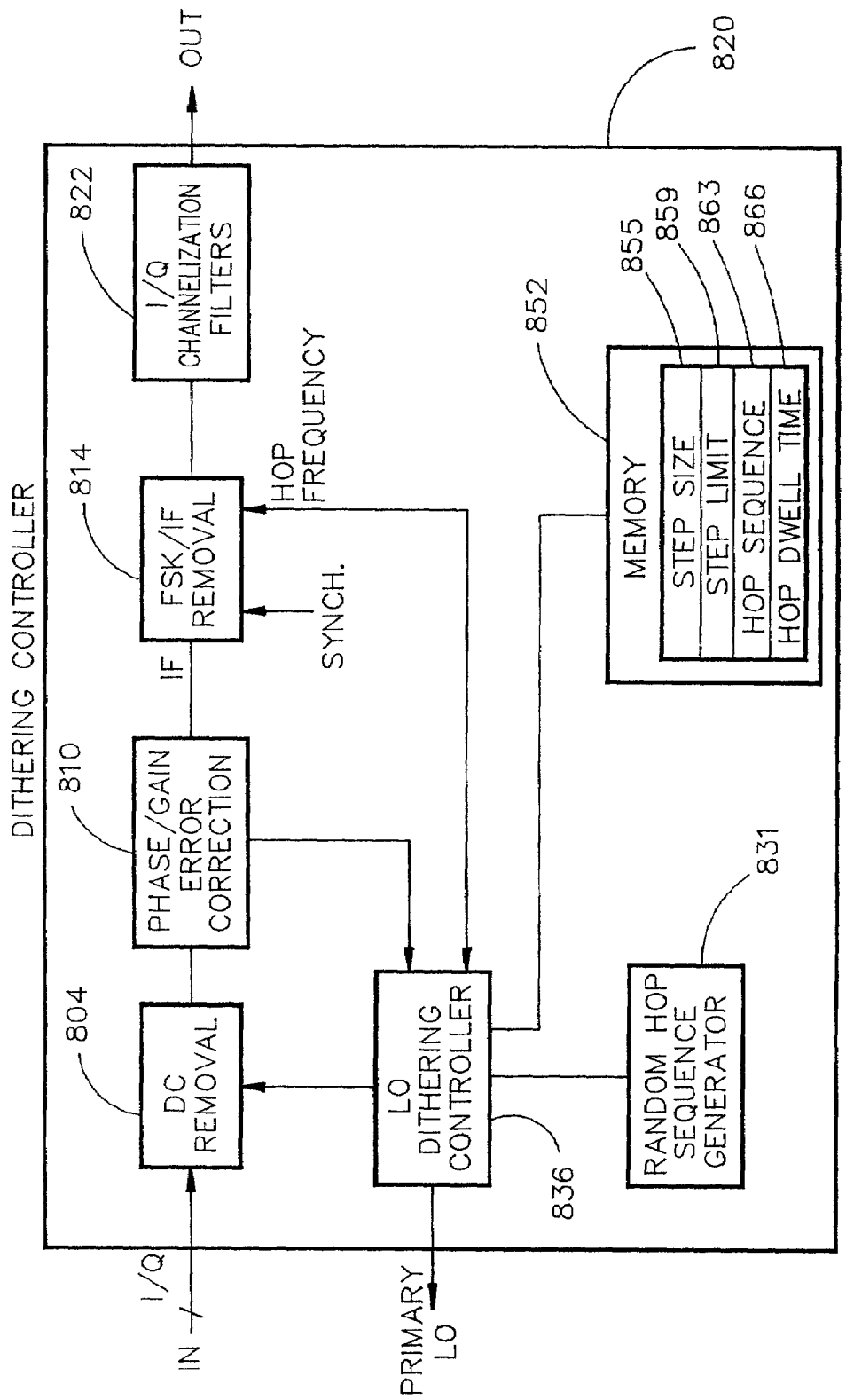
FIG. 8 is a block diagram of a dithering controller according to one embodiment of the invention.

FIG. 8 is a block diagram of a dithering controller 820 according to one embodiment of the invention. The dithering controller 820 includes a phase/gain error correction block 810, a FSK removal block 814, a LO dithering controller 836, an optional I/Q channelization filter block 822, an optional DC removal block 804, and a memory 852 or a random hop sequence generator 831. The input into the dithering controller 820 is connected to the DC removal block 804 and the output of the dithering controller 820 is provided as an output from the I/Q channelization filter block 822. An additional output of the dithering controller 820 is a feedback to the primary LO 608 from the LO dithering controller 836.

The memory 852 may include a step size storage 855 and a step limit storage 859 that store predetermined step size and predetermined step limit values. These two step values may be used to calculate a step frequency when the primary LO 608 is offset by a step value. The memory 852 may also include a hop sequence storage 863 and a hop dwell time storage 866 that store a predetermined hop sequence and a predetermined hop dwell time. The hop sequence information may be used to dither the primary LO 608 over a plurality of hop frequencies. Alternatively, the hop sequence may be obtained from the random hop sequence generator 831.

The phase and gain error correction block 810 generates phase and gain (I and Q) error measurements for a received channel. The phase and gain error correction block 810 may also correct the phase and gain error, and may provide the phase and gain error coefficients to the LO dithering controller 836 in order to enable the dithering or offsetting of the primary LO 608.

The LO dithering controller 836 receives information about a phase and gain error and generates a tuning word or command that dithers or offsets the primary LO 608. In addition, the LO dithering controller 836 may implement a sequence of hop frequencies, and may optionally be capable of dropping and even reinstating problematic hop frequencies in a hop sequence, based on the phase and gain error measurements. The LO dithering controller 836 provides synchronization control for the start of every new hop. In addition, the LO dithering controller 836 provides a feedback to the phase/gain error correction block 810 regarding which frequency or frequencies of a hop sequence are divergent.

The LO dithering controller 836 may include a frequency synthesizer or frequency synthesis function that generates a tuning word or command. In addition, the LO dithering controller 836 may include a FSK modulator that generates a FSK modulation scheme as part of the tuning word in order to match the FSK modulation present at the primary LO 608.

In conjunction with the FSK dithering, the phase and gain error correction block 810 is synchronized with the FSK hop dwells. Each FSK dwell is calibrated and makes a decision on which FSK dwell is phase and gain error divergent from the arithmetic average of the FSK dwells. The algorithm does this by finding the arithmetic average of the dci and dcq values from the FSK hop sequence, and picking the dwell with a dci and dcq pair that are the most divergent from the arithmetic average. In order to find the arithmetic average of the FSK dwells, a minimum of 3 FSK hop frequencies are required. The divergent dci and dcq pair are thrown out, and the remaining FSK dwell dci and dcq values are averaged for that FSK hop sequence. This average is used to calculate the $K_1$ and $K_2$ correction coefficients used for phase and gain error correction, and there can only be 1 average phase and gain error correction update per FSK hop sequence. If the FSK hop sequence includes 4 frequencies, then 4 calibrations are required (1 for each FSK dwell), in order to eliminate the hop frequency or dwell that generates a frequency coherent interfering image.

The LO dithering controller 836 may include a FSK modulator and a FSK dwell synchronization (not shown). The FSK modulator tunes the primary LO 608 to the required FSK dwell frequency every $T_{DWELL}$ seconds. In conjunction with the FSK modulator, the FSK dwell synchronization will maintain dwell synchronization between the FSK removal block 814 and the FSK modulator in order to generate a plurality of hop frequencies according to the invention.

The purpose of the FSK removal block 814 is to remove the FSK dithering that is applied to the primary LO 608. The FSK removal block 814 receives a synchronization start signal or information from the LO dithering controller 836 for the start of each new frequency hop. In addition, the FSK removal block 814 receives the IF frequency value $f_{IF}$ and receives a current hop frequency value $f_{HOP}$.

The FSK removal block 814 may include a quadrature digital LO (i.e., an I signal component mixer and a Q signal component mixer). In the case of the baseband-IF system, the FSK removal block 814 performs a complex mixing (i.e., down-converting or up-converting in the case of a negative IF) of the signal to zero Hertz. The FSK removal block 814 therefore cancels the effects of the dithering in the primary LO 608 by mixing in the opposing direction as the current hop frequency in order to cancel out the FSK dithering. The complex down-conversion or up-conversion is given as:

$$I_{OUT} = I_n \cos[2\pi T(-f_{IF}+f_{HOP})*n] - Q_N \sin[2\pi T(-f_{IF}+f_{HOP})*n] \quad (1)$$

and $$Q_{OUT} = I_n \sin[2\pi T(-f_{IF}+f_{HOP})*n] - Q_N \cos[2\pi T(-f_{IF}+f_{HOP})*n] \quad (2)$$

where T is the period of the sample frequency $f_S$, $f_{HOP}$ is the hop frequency, $f_{IF}$ is the non-dithered IF of the system, $I_n$ and $Q_n$ are the I and Q values produced at the particular hop frequency $f_{HOP}$, and (n) equals the current $I_n$ and $Q_n$ samples at a sampling time n (in the discrete domain). It should be noted that complex mixing will be needed for both the baseband-IF and the zero-IF modes. However, not all received waveforms will require the removal of the FSK dithering. As an example, with AM, the removal of the FSK dithering is not necessary because mathematically the FSK dithering falls out in the demodulator.

In the baseband-IF case, the FSK removal block 814 may be the same as that for the zero-IF system. In the baseband-IF case, the IF frequency will be the same as the IF of the system and the hop frequency will be the same as in the zero-IF system.

The DC removal block 804 removes a DC bias that may be present in the I/Q signal. The DC removal block 804 may be a coupling capacitor. Alternatively, the DC removal block may be implemented in software, may be programmed into an application specific integrated circuit (ASIC), a field program gate array (FPGA), or may be implemented with discrete components as a simple one pole IIR high pass filter or any other filter technique that effectively removes the DC component.

In addition, the DC removal block 804 may be implemented in software as a DC calculation algorithm. The DC removal block 804 may receive feedback from the LO dithering controller 836 concerning which frequency of a frequency hop sequence is divergent, as previously discussed. The DC calculation algorithm may calculate the average of each I/Q channel, according to:

$$I_{DC} = \sum_{0}^{N-1} I_n / N \text{ for } n = 0 \text{ to } N-1 \quad (3)$$

and $$Q_{DC} = \sum_{0}^{N-1} Q_n / N \text{ for } n = 0 \text{ to } N-1 \quad (4)$$

wherein the average of $I_{DC}$ and $Q_{DC}$ is the DC offset. The average may then be subtracted from the I/Q channels, giving:

$$I_{OUT} = I_n - I_{DC} \quad (5)$$

and $$Q_{OUT} = Q_n - Q_{DC} \quad (6)$$

In the baseband-IF system, the DC removal block 804 is optional, depending on the amount of DC offset of the analog system and the waveform that is being processed.

Alternatively, in place of using feedback from the phase/gain error correction block 810 about which frequency in a hop frequency sequence is divergent, the DC removal block 804 may use an algorithm similar to the one that is used in the phase/gain error correction block 810. The DC level is measured and stored for each frequency, the average is calculated and an outlier I/Q coefficient pair is determined and removed. The remaining DC measurements for each frequency are averaged and this may be used for the I/Q channel DC offset removal.

The I/Q channelization filter block 822 may comprise two low pass filters, one for the I channel and one for the Q channel. For the baseband-IF mode, the purpose of the I/Q channelization filter block 822 is to filter off the adjacent channel signal. In addition, the I/Q channelization filter block 822 removes the synthesizer 1/f noise and the DC component, if present, after the final complex mix to zero Hertz. In a zero-IF configuration, the dithering controller 820 does not need the I/Q channelization filter block 822 because there is no adjacent channel interferer.

In operation, the I/Q signal is received in the dithering controller 820 and the phase/gain error is measured by the phase/gain error correction block 810. The phase/gain error correction block 810 provides a phase/gain error signal to the LO dithering controller 836. In response to the phase and gain error measurement, the LO dithering controller 836 controls the primary LO 608 to achieve a plurality of hop frequencies or may generate a single offset of the primary LO 608. The dithering may be centered about a zero-IF or may be centered about an offset, such as a baseband-IF, for example.

The dithering controller 820 as discussed above may be implemented in hardware circuitry. Alternatively, the dithering controller 820 may be implemented in a software routine, wherein the input is a digital data stream representing the I/Q components of the signal. Therefore, the dithering controller 820 may be implemented in software embedded on a processor, including a DSP, or may be programmed into a FPGA or an ASIC, for example.

Since the I and Q channels are at an IF which is equivalent to one-half the RF channel spacing, the AM notching effect, the AM sideband notching effect, the FM notching effect, and the AM beat note distortion anomalies are eliminated. The problem with direct conversion receivers associated with microphonics is also eliminated. EMI (electromagnetic interference) can also be eliminated or reduced by managing the IF frequency and managing the DC removal block. If the IF frequency and the corner frequency of a DC blocking high pass filter are chosen carefully, then effects from EMI may be eliminated or reduced. The synthesizer 1/f noise is also eliminated by the final complex digital frequency mixing, which pushes the synthesizer 1/f noise out of band.

Figure 9:
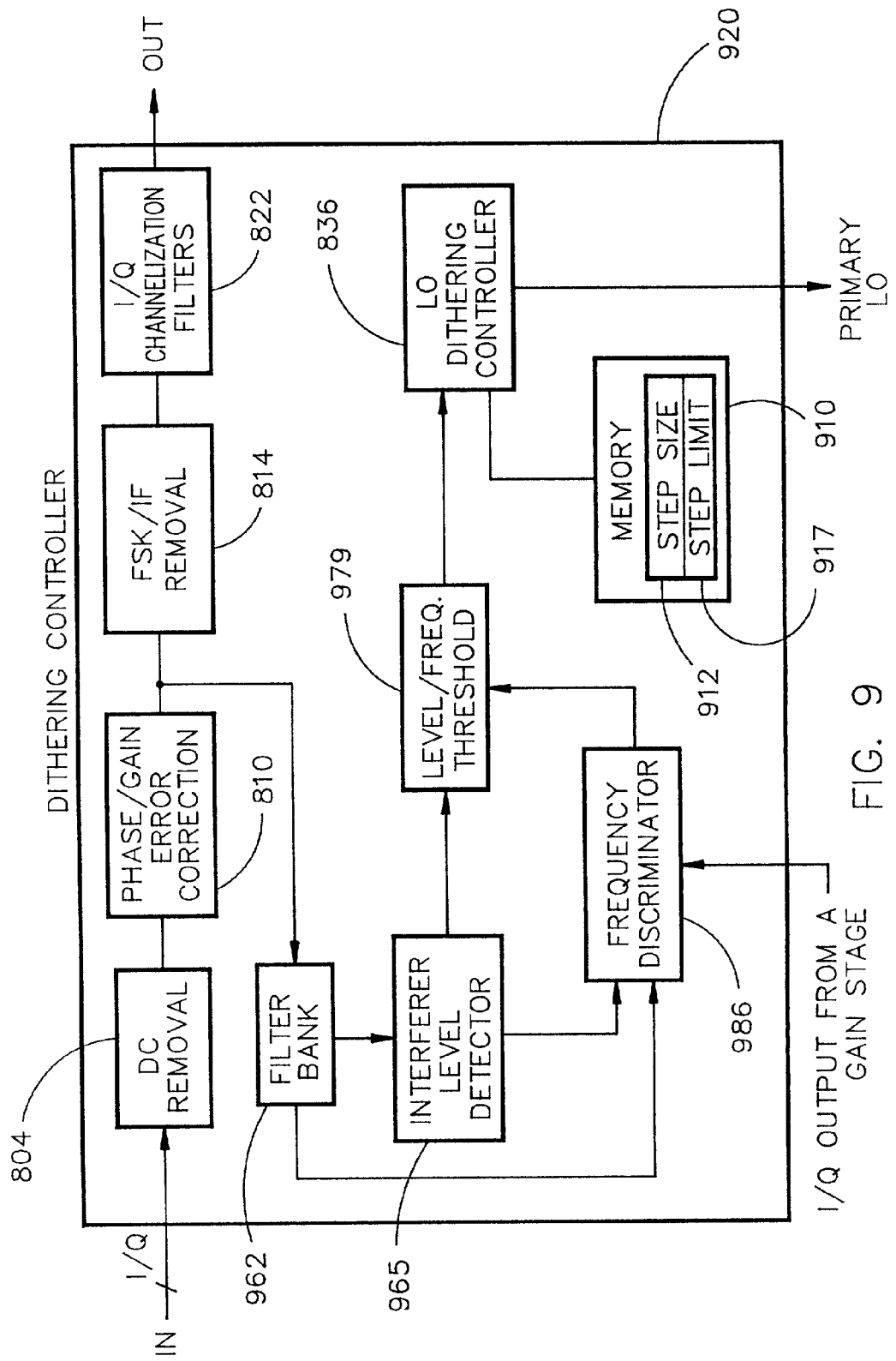
FIG. 9 is a block diagram of a dithering controller according to another embodiment of the invention.

FIG. 9 is a block diagram of a dithering controller 920 according to another embodiment of the invention. The dithering controller 920 in this embodiment may include the optional DC removal block 804, the optional I/Q channelization filter 822, the LO dithering controller 836, and the phase/gain error correction block 810, as previously discussed. In addition, the dithering controller 920 includes a complex I/Q filter bank 962, an interferer level detector 965, a level/frequency threshold comparison 979, a frequency discriminator 986, and a memory 910. The memory 910 may include a step size storage 912 and a step limit 917.

The dithering controller 920 is intended to be used with self-dithering waveforms, such as FSK. There may be no need to FSK dither the primary LO 608 in order to prevent adjacent channel image coherency when the desired channel waveform is self-dithering. One area that may be of potential risk is when the adjacent channel interferer becomes frequency coherent with a self-dithering waveform that has energy at a fixed carrier frequency. The dithering controller 920 therefore is designed to detect when an adjacent channel interferer may become frequency coherent with the desired channel's carrier, and to move the primary LO 608 in order to mitigate potential notching effects. It should be noted that the primary LO 608 only needs to be moved a few Hertz in order to prevent coherency.

The complex I/Q filter bank 962 receives an I/Q signal input and generates a plurality of spectral outputs. The filter bank 962 can be tuned to generate an output for one or more possible adjacent channel interferer frequencies. If an adjacent channel interferer might be present, one of the filters in the filter bank 962 may be tuned to that particular frequency.

The purpose of the filter bank 962 is to isolate the adjacent channel with a potential interferer. The filter bank 962 will filter off the desired channel and will isolate the signals in the interfering band.

The frequency discriminator 986 receives all spectral outputs from the filter bank 962. In response, the frequency discriminator 986 generates a spectral component for each spectra output from the filter bank 962. The magnitude of each spectral component is related to the signal power of each spectral component. The frequency discriminator 986 may generate the plurality of spectral components by implementing a FFT (Fast Fourier Transform) algorithm. The frequency discriminator 986 compares the power of each spectral component to a predetermined power threshold. If any spectral components in the interfering band exceed a frequency threshold near the desired channel's carrier frequency, then the primary LO 608 is offset. The predetermined power threshold may be a predicted or expected power level of the desired channel, for example.

However, the desired channel I/Q output that is fed back has been down-converted to zero Hertz. Therefore, the actual frequency (i.e., the spectral components) of the desired channel FFT will need to have the IF added to it before the frequency comparison is made between the interfering band and the desired band.

The interferer level detector 965 detects a signal power of an adjacent channel interferer and outputs a power measurement for each frequency spectra of the plurality of frequency spectra. If the measured power exceeds a predetermined power threshold, then an adjacent channel interferer is detected. The predetermined power threshold may be the (predicted) power of the signal in the desired band, for example. The interferer level detector 965 may output the largest power measurement for the plurality of frequency spectra, or may output all measurements. The interferer level detector 965 continually looks for and detects potential interferers.

The level/frequency threshold 979 compares a frequency spectra to a predetermined power threshold. The predetermined power threshold can be set in hardware or software, depending on the implementation. This block also receives an output from frequency discriminator 986, such as a flag or other indicator that indicates which frequency spectra/filter output has exceeded the predetermined power threshold, as determined by the level/frequency threshold 979. If the threshold is exceeded, than a potential carrier coherent interferer has been detected, and the LO dithering controller 836 will move the primary LO 608 in order to eliminate any coherency. It should be noted that the purpose of the interferer level/frequency threshold 979 is to prevent detection of the desired channel's image. If there is no adjacent channel interferer, and if there is any residual phase and gain errors, then there will be an image frequency that could be detected as a coherent interferer. The interferer level/frequency threshold 979 will prevent detection of the desired channel's image.

The LO dithering controller 836 in this embodiment receives an output from the level/frequency threshold detection 979 that indicates that an adjacent channel interferer has been detected. The LO dithering controller 836 may access a step size that is stored in the step size storage 912 and may access a step limit that is stored in the step limit storage 917. The LO dithering controller 836 may then generate a new step frequency $f_{STEP}$ using these stored values and may generate a feedback tuning word or command to the primary LO 608. Therefore, the dithering controller 920 according to this embodiment creates a plurality of spectra for possible adjacent channel interferers, continuously compares the power level of each spectra to a predetermined power threshold, and offsets the primary LO 608 if a particular frequency spectra exceeds the predetermined power threshold.

Figure 10:
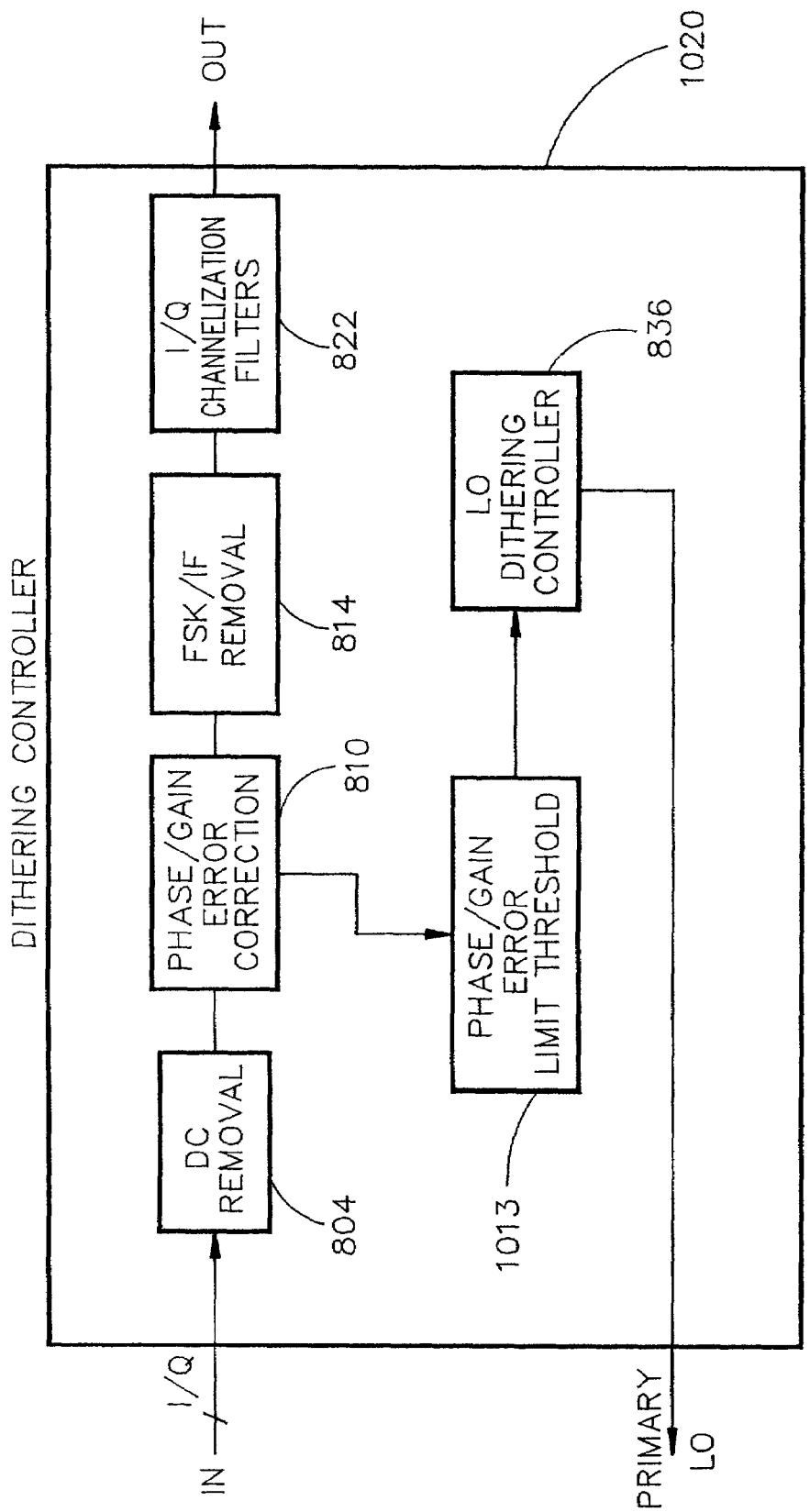
FIG. 10 is a block diagram of a dithering controller according to yet another embodiment of the invention.

FIG. 10 is a block diagram of a dithering controller 1020 according to yet another embodiment of the invention. The dithering controller 1020 in this embodiment may include the optional DC removal block 804, the optional I/Q channelization filter 822, the LO dithering controller 836, and the phase/gain error correction block 810, as previously discussed. In addition, the dithering controller 1020 includes a phase error/gain error limit threshold 1013.

The phase and gain error threshold 1013 detects large changes in the perceived (calculated) phase and gain errors. When an adjacent channel interferer is frequency coherent with the desired channel, large changes can occur in the calculated phase and gain error. Therefore, the phase and gain error threshold 1013 calculates a difference between a current phase and gain error and a previous phase and gain error. The phase and gain error threshold 1013 then compares the difference to a predetermined phase and gain error limit threshold (i.e., a difference threshold). The predetermined phase and gain error limit can be set in hardware or software, depending on the implementation. The phase and gain error limit threshold 1013 generates an error output if the calculated phase and gain error difference exceeds the predetermined phase and gain error limit, and the dithering controller 1020 offsets the primary LO 608.

Detecting large changes in phase and gain error is possible when prior information is known concerning actual phase and gain error. The prior information may be determined and programmed into a lookup table that contains predetermined phase and gain error correction coefficients that were determined across the tuning bandwidth of the receiver 600.

Figure 11:
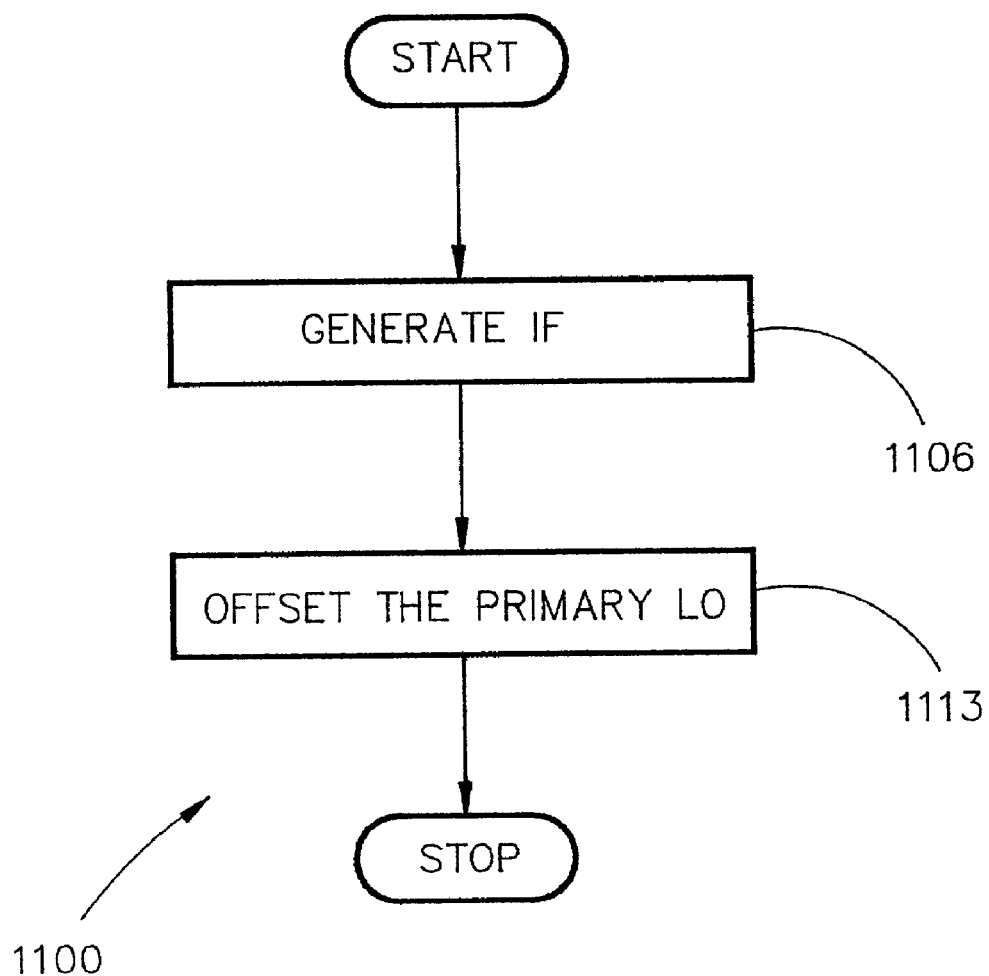
FIG. 11 is a flowchart of one primary LO offset method according to one embodiment of the invention.

FIG. 11 is a flowchart 1100 of one primary LO offset method according to one embodiment of the invention. In step 1106, the phase and gain error of the received channel is detected and measured, such as by employing a rotating vector approach, as previously discussed.

In step 1113, the primary LO 608 is offset. The offset is based on the phase and gain error, as previously discussed. The offset may comprise frequency stepping or dithering. As a result, the phase and gain errors may be corrected while reducing the errors typically associated with a zero-IF or a baseband-IF receiver implementation.

Figure 12:
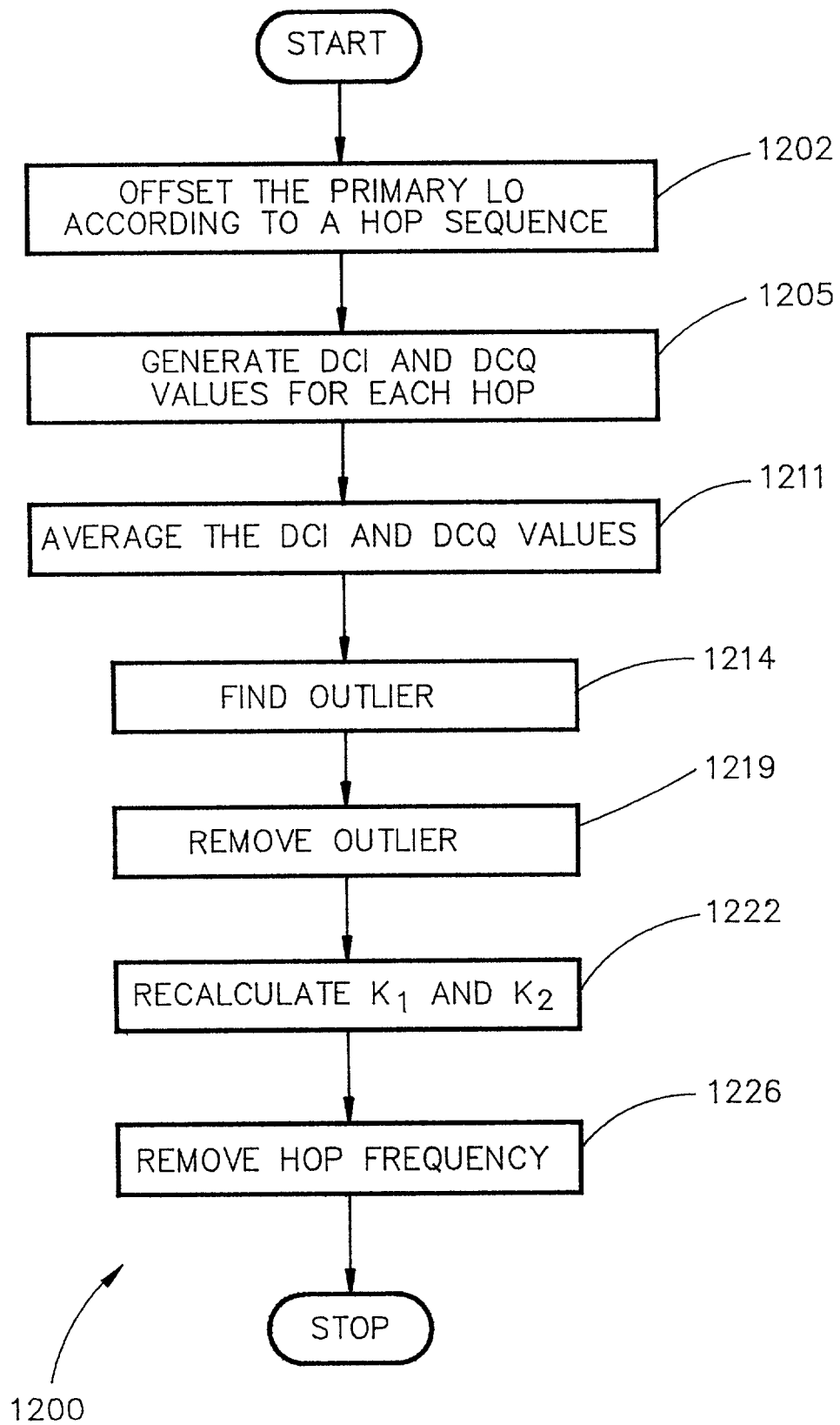
FIG. 12 is a flowchart of another primary LO offset method according to yet another embodiment of the invention.

FIG. 12 is a flowchart 1200 of another primary LO offset method according to another embodiment of the invention. In step 1202, the primary LO 608 is dithered according to a predetermined hop sequence. The hop sequence may include a plurality of frequency hop values and each hop may be set to a predetermined dwell time $T_{DWELL}$. The hop sequence is generally repeating.

In step 1205, dci and dcq measurements are generated for each hop of a hop sequence to produce a set of dci and dcq values. The dci and dcq measurements may be generated by the rotating vector method of Loper, for example. The dci and dcq values reflect a phase and gain error for each particular hop frequency.

In step 1211, the set of dci and dcq values are averaged.

In step 1214, a dci and dcq outlier pair is found in the set of dci and dcq values. In one embodiment, the outlier is found by comparing each dci and dcq pair to the dci and dcq average, with the outlier being the dci and dcq pair that is farthest from the average. In an alternate embodiment, each phase and gain error coefficient pair is compared to a predetermined outlier threshold. An outlier phase and gain error coefficient pair that most exceeds the predetermined outlier threshold is the outlier. In another alternative embodiment, any phase and gain error coefficient pair that exceeds a predetermined outlier threshold is an outlier (multiple outlier coefficient pairs may be found).

The predetermined outlier threshold may be stored in a table or storage device in the receiver 600 and may be obtained in several ways. The predetermined outlier threshold may be a calculated optimum I/Q error value. Alternatively, it may be a calculated optimum I/Q error value and may include one or more tables of correction factors, such as an ambient temperature correction table. In another alternative, the outlier threshold may be experimentally determined and may be programmed into the receiver 600 during the manufacturing process. In yet another alternative, the predetermined outlier threshold may be calculated at power up of the device or at other time intervals and may be stored in order to reflect current operating conditions.

In step 1219, the dci and dcq outlier pair is removed from the dci and dcq average. As a result, the dci and dcq outlier pair is not used to calculate the $K_1$ and $K_2$ correction coefficients.

In step 1222, the phase and gain error coefficients $K_1$ and $K_2$ are re-calculated. The new calculation employs only the remaining dci and dcq values, and does not include the outlier dci and dcq values that were removed in step 1219 above.

In an optional step 1226, the hop frequency that generated an outlier dci and dcq pair may be removed from the hop sequence. The removal may be temporary or may be permanent. In addition, the optional removal step may comprise a shifting step wherein a hop frequency that generates a dci and dcq outlier may be itself shifted in order to avoid an adjacent channel frequency coherent interferer.

The above method may be an iterative process, wherein the divergent hop frequency is removed and the corresponding dci and dcq values are removed from the average. The method may be repeated M times (where N is the number of hop frequencies and M<N). Therefore, for each iteration of M, a new average is calculated and a new divergent dwell is determined and removed from the average. Therefore, for a hop sequence of N hops, M divergent dwells could be removed.

Figure 13:
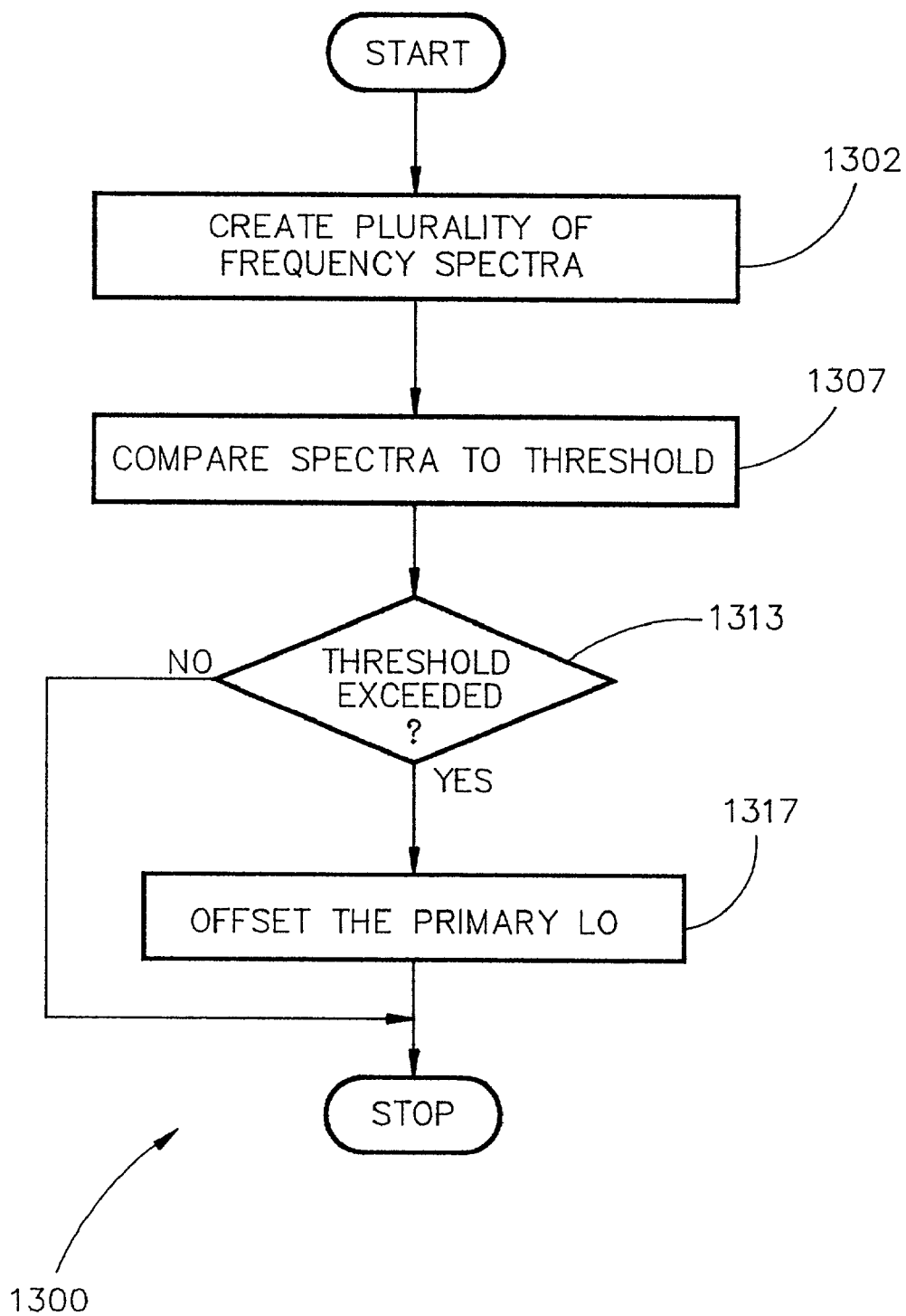
FIG. 13 is a flowchart of yet another primary LO offset method according to yet another embodiment of the invention.

FIG. 13 is a flowchart 1300 of yet another primary LO offset method according to yet another embodiment of the invention. The method 1300 measures the power in an interfering frequency band. In step 1302, a plurality of frequency spectra are created from the signal received from the primary LO 608. The plurality of frequency spectra may be created in order to detect possible adjacent channel interferers. The individual frequency spectra may therefore be chosen to be most likely to find an adjacent channel interferer. The plurality of frequency spectra may be created by a filter bank, for example.

In step 1307, the spectra are compared to a predetermined power threshold. The predetermined power threshold may be the power of the signal in the desired band, for example.

In step 1313, the method detects whether a signal power of the frequency spectra has exceeded the predetermined power threshold. If the measured power exceeds the predetermined power threshold, then an adjacent channel interferer is detected, and the method proceeds to step 1317, otherwise step 1317 is skipped.

In step 1317, the primary LO 608 is offset. The offset is preferably chosen to step the primary LO 608 away from an adjacent channel interferer. The offset may be temporary and done for a fixed time, or may be maintained as long as the adjacent channel interferer is detected.

Figure 14:
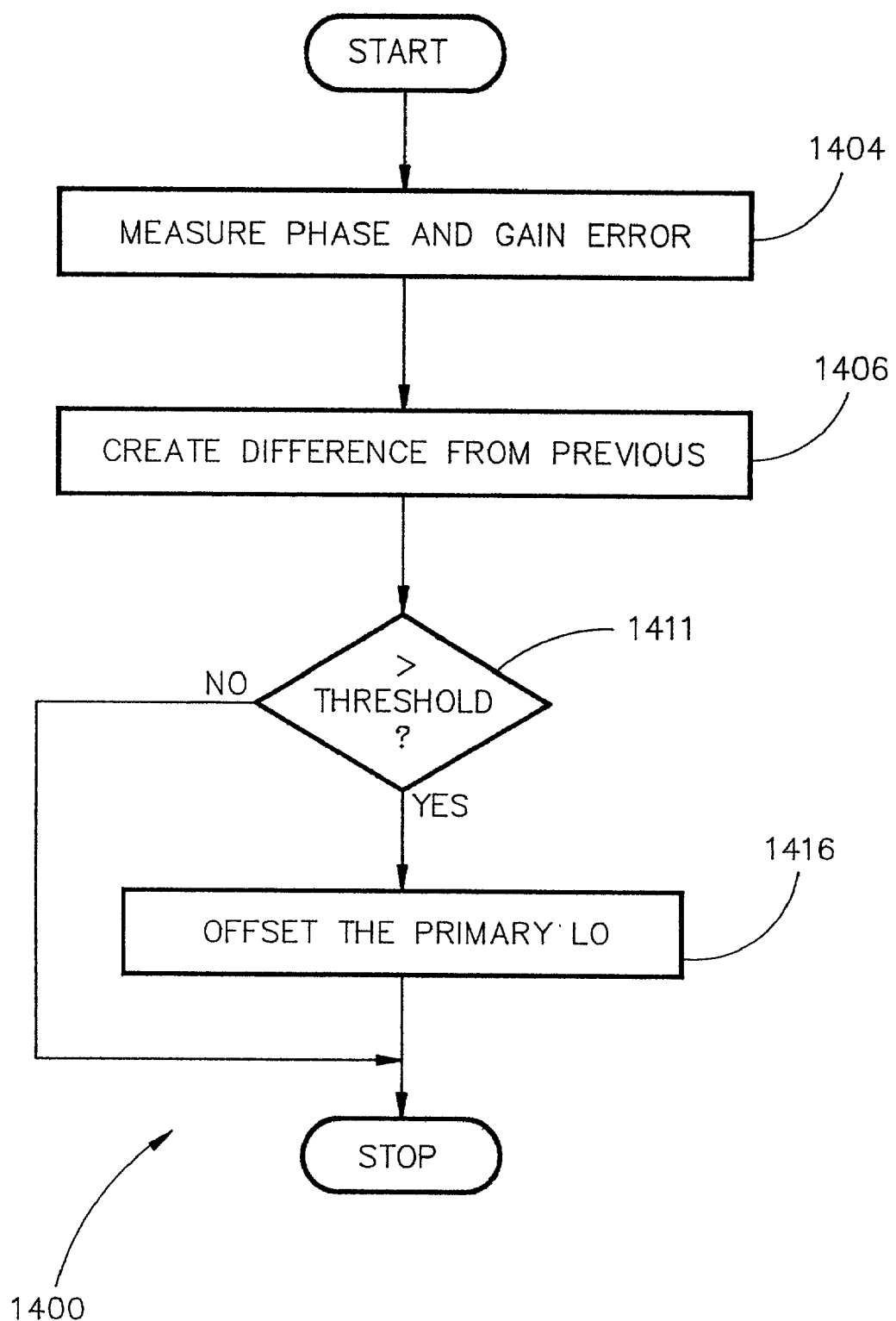
FIG. 14 is a flowchart of yet another primary LO offset method according to yet another embodiment of the invention.

FIG. 14 is a flowchart 1400 of yet another primary LO offset method according to yet another embodiment of the invention. In step 1404, the phase and gain error is measured as previously discussed.

In step 1406, the current phase and gain error measurement and a previous phase and gain error measurement are used to create a difference. The two measurements may be separated by a predetermined time period, for example, or may be taken every frequency hop.

In step 1411, the difference is compared to a predetermined difference threshold. If the difference exceeds the threshold, the method proceeds to step 1416.

In step 1416, the primary LO 608 is offset. As previously discussed, preferably the offset may be designed to move the primary LO 608 away from an adjacent channel interferer and may be done according to a predetermined offset amount.

Figure 15:
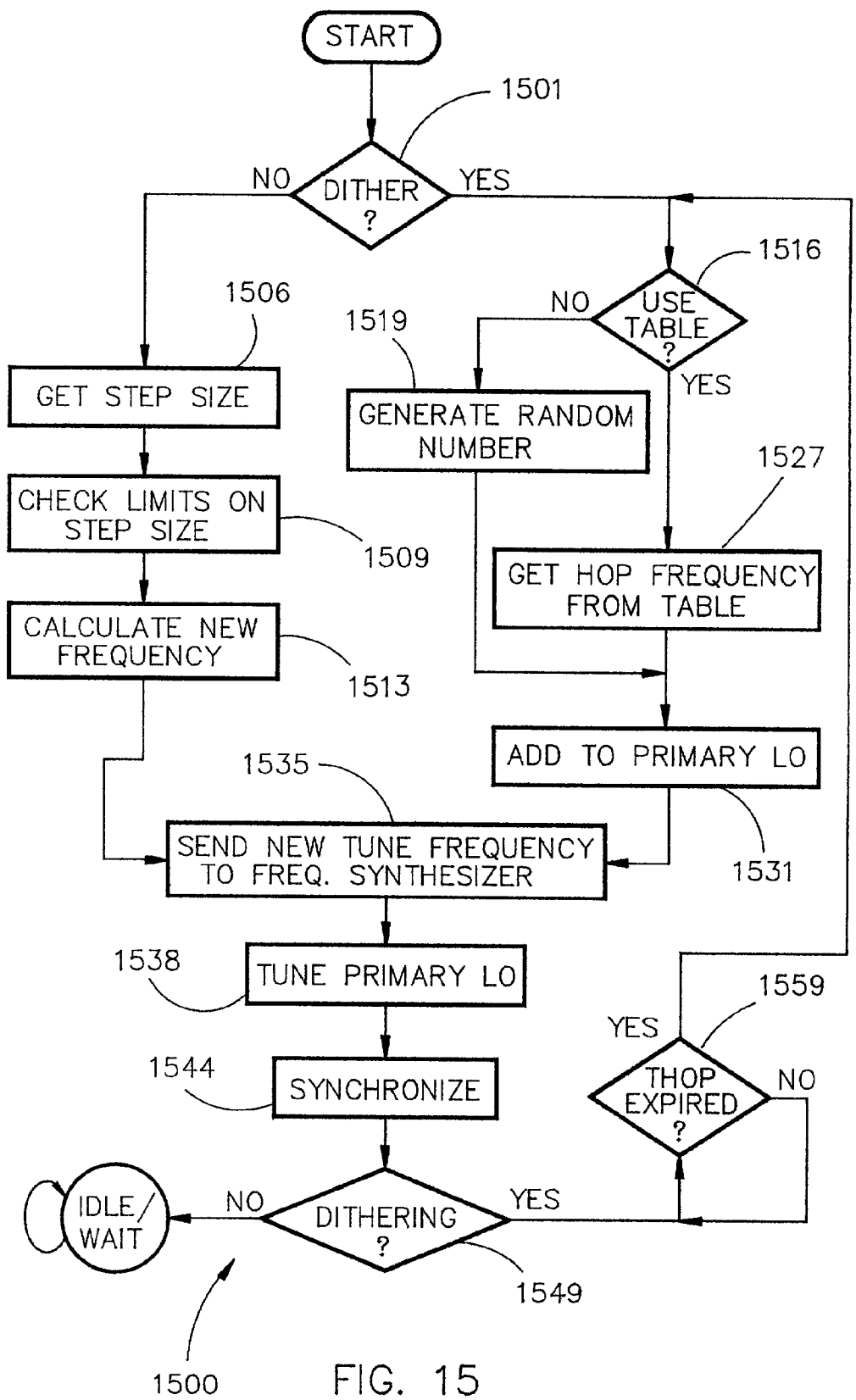
FIG. 15 is a flowchart of a LO dithering controller process according to one embodiment of the invention.

FIG. 15 is a flowchart 1500 of a LO dithering controller process according to one embodiment of the invention. In step 1501, the LO dithering controller 620 must decide whether to dither the primary LO 608 or to step the primary LO 608. If the LO dithering controller 620 is performing dithering, it proceeds to step 1516; otherwise it proceeds to step 1506.

In step 1506, the LO dithering controller 620 receives a frequency step size $f_{STEP}$. The step size may be received from a table or storage, or may be an increment value that is added to the existing tuning word or command. The step size is the number of Hertz added to the primary LO controller 608 during a frequency stepping operation.

In step 1509, the combination of the primary LO 608 plus the potential step frequency $f_{STEP}$ is checked to ensure that it has not exceeded an offset limit. For example, the step size may be limited to less than the RF channel bandwidth. Other limitations may also be employed depending on the application and may be less than the RF channel size. In one embodiment, the frequency may be stepped upward until it reaches an upper limit, and then is stepped downward until it reaches a lower limit, etc. The stepping may continue indefinitely, and the primary LO 608 may be stepped whenever a coherent adjacent channel interferer is detected.

In step 1513, a new frequency is calculated if required. The new frequency may therefore be the original frequency $f_O$ plus the step frequency $f_{STEP}$ ($f_O$=the frequency of the primary LO 608 without any stepping). The method then proceeds to step 1535, discussed below.

In step 1516, if the LO dithering controller 620 is using stored values, the method proceeds to step 1527; otherwise it proceeds to step 1519.

In step 1519, the LO dithering controller 620 receives a random hop frequency $f_{HOP}$ that was randomly generated, as is known in the art. The randomly generated $f_{HOP}$ frequency is preferably boundary-checked and remains within a boundary M.

In step 1527, the hop frequency $f_{HOP}$ is retrieved from storage, such as from a table of hop frequencies.

In step 1531, the hop frequency $f_{HOP}$ is added to the original frequency $f_O$ of the primary LO 608.

In step 1535, the new tuning frequency is sent to the frequency synthesizer, with the frequency synthesizer retuning the primary LO 608 to the new frequency.

In step 1538, the primary LO 608 is tuned according to the tuning word or command in order to generate the new IF. The tuning word or command may perform a frequency dithering or stepping.

In step 1544, the various components of the receiver are synchronized. The synchronization therefore receives and uses the carrier frequency $f_c$, the original primary LO frequency $f_O$, the hop frequency $f_{HOP}$ or alternatively the step frequency $f_{STEP}$, the delay time $T_{DELAY}$, and the hop dwell time $T_{HOP}$ in order to synchronize the various components and/or functions of the receiver 600. For example, the DC removal block 804 may receive the new $f_{STEP}$ or $f_{HOP}$ frequencies in order to calculate and remove the DC bias. Other components that may receive the $f_{STEP}$ or $f_{HOP}$ frequencies may be, for example, the FSK removal block 814 (see FIG. 8).

In step 1549, the LO dithering controller again determines whether it is dithering or stepping the primary LO 608. If it is not dithering, it enters an idle or wait mode wherein it waits for a new step. If the LO dithering controller 620 is dithering the primary LO 608, the method proceeds to step 1559.

In step 1559, the LO dithering controller 620 checks to see whether the hop time $T_{HOP}$ has expired. If it has not, the LO dithering controller 620 waits until it has expired. The $T_{HOP}$ value therefore determines how long to dwell at each hop frequency. When $T_{HOP}$ has expired, the method branches back to step 1516, which generates a new hop frequency and processes the new hop frequency, as previously described.

Figure 16:
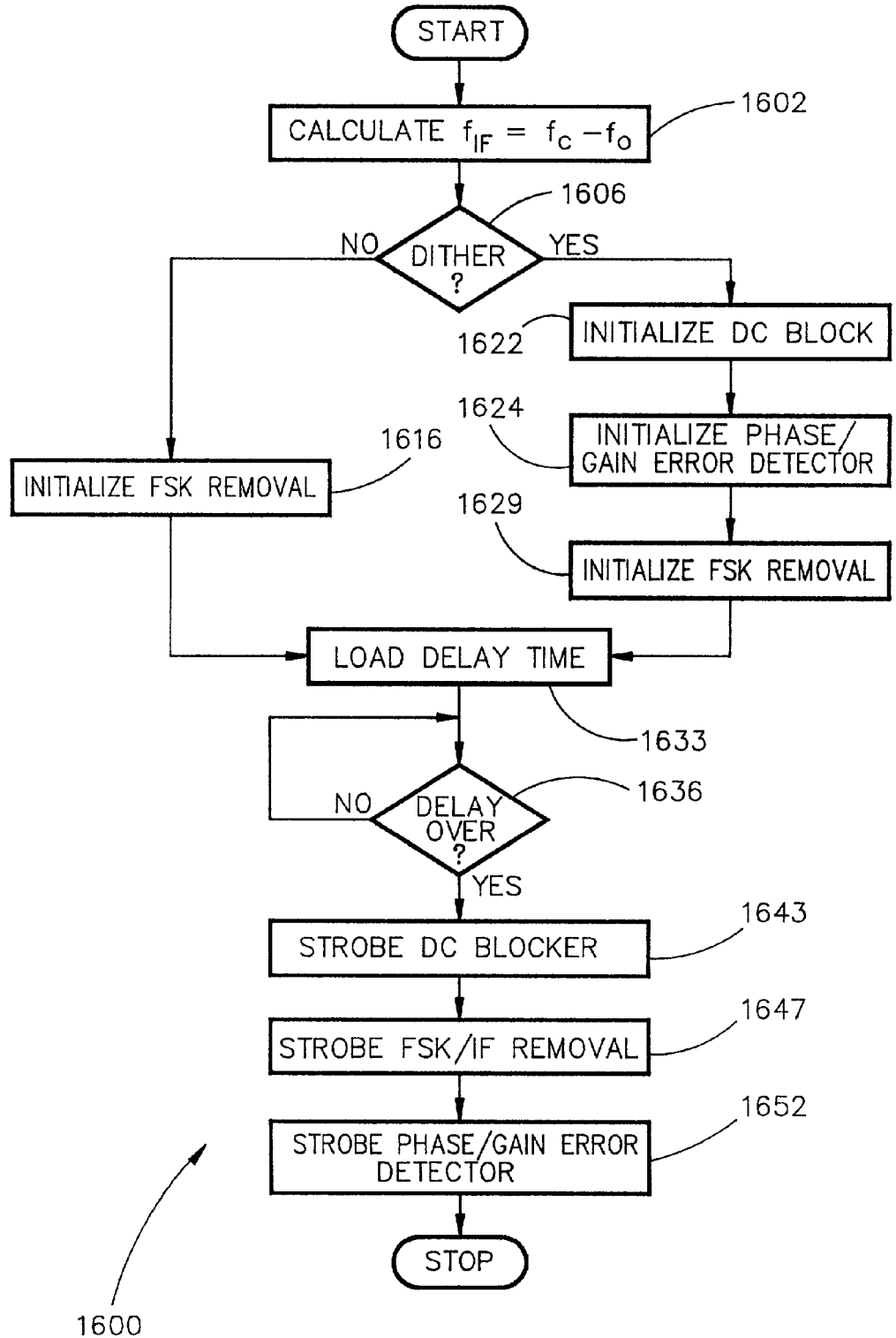
FIG. 16 is a flowchart of a system synchronization process according to one embodiment of the invention.

FIG. 16 is a flowchart 1600 of a system synchronization process according to one embodiment of the invention. In step 1602, the current $f_{IF}$ is calculated as $f_{IF}=f_C$(carrier frequency)$-f_o$ (the original frequency of the primary LO 608).

In step 1606, the method determines whether the primary LO 608 is being dithered or stepped. If it is being dithered, the method proceeds to step 1622; otherwise it proceeds to step 1609.

In step 1616, the FSK removal block 814 is initialized with the current $f_{IF}$ and the current $f_{STEP}$. This step is not needed if the FSK removal block 814 is not implemented in the receiver 600.

In step 1622, in the dithering method, the DC removal block 804 is also initialized. In step 1622, however, unlike step 1609, the hop dwell time $T_{HOP}$ is communicated to the DC removal block 804.

In step 1624, the phase and gain error detector 810 is also initialized. The initialization includes the hop dwell time $T_{HOP}$.

In step 1629, the FSK removal block 814 is initialized. In the initialization, the FSK removal block 814 receives the IF frequency $f_{IF}$, the hop frequency $f_{HOP}$, and the hop dwell time $T_{HOP}$.

In step 1633, a delay time $T_{DELAY}$ is loaded. The delay time $T_{DELAY}$ is a delay time the receiver 600 waits after a frequency hop or step is initialized before the DC removal, the phase and gain error correction, etc., are activated for the new hop or step. The delay time $T_{DELAY}$ is a system delay from the start of a new tune and the start of the new hop (dwell) or step.

In step 1636, the method waits until the delay time, $T_{DELAY}$, has expired. When $T_{DELAY}$ expires, the method proceeds on to step 1643.

In step 1643, the DC removal block 804 is strobed, if required. This may be done in order to initiate a DC removal action.

In step 1647, the FSK/IF removal block 814 is strobed, if required. This may be done in order to initiate a FSK calculation and removal action.

In step 1652, the phase and gain error detector 810 is strobed in order to initiate a phase and gain error calculation and correction action.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A direct conversion quadrature receiver, comprising:
   a primary local oscillator (LO) that down-converts a received RF signal to a quadrature intermediate frequency (IF) signal; and
   a dithering controller responsive to said quadrature IF signal generated by said primary LO for communicating a feedback signal back to said primary LO, said feedback signal controlling an oscillation frequency of said primary LO, the dithering controller comprising
      a filter bank comprising one or more I signal component filters and one or more Q signal component filters, said filter bank generates a plurality of frequency spectra from said quadrature IF signal,
      an interferer level detector that measures each frequency spectra of said plurality of frequency spectra,
      a frequency discriminator that generates a frequency number for each spectra output from said filter bank, and
      a level/frequency threshold including a predetermined power threshold that compares a signal power of each frequency spectra to said predetermined power threshold, wherein said level/frequency threshold provides a step-required output to said LO dithering controller if a frequency spectra of said plurality of frequency spectra exceeds said predetermined power threshold;
   wherein said dithering controller offsets down-conversion of said RF signal by said primary LO from a zero-IF in order to reduce a phase and gain error of said quadrature IF signal.

2. The receiver of claim 1, further comprising a phase and gain error measurement apparatus that measures a phase and gain error of said quadrature IF signal and generates a phase and gain error signal, wherein said dithering controller offsets said primary LO based on said phase and gain error signal.

3. The receiver of claim 2, wherein said dithering controller controls said primary LO to step said quadrature IF signal in response to said phase and gain error signal.

4. The receiver of claim 1, further comprising a memory storing a predetermined step size that steps said primary LO away from a current quadrature IF signal and a predetermined step limit that limits a stepping of said primary LO to a predetermined frequency range.

5. The receiver of claim 1, wherein said dithering controller controls said primary LO to dither said quadrature IF signal according to a predetermined hop sequence.

6. The receiver of claim 1, further comprising a memory storing a predetermined hop sequence that dithers said primary LO over a plurality of hop frequencies.

7. The receiver of claim 1, wherein the dithering controller further comprises:
   a phase and gain error limit threshold that compares a current phase and gain error to a previous phase and gain error, generates a phase and gain error difference, and generates a step-required output to said LO dithering controller if said phase and gain error difference exceeds a predetermined phase and gain error limit threshold.

8. A direct conversion quadrature receiver, comprising:
- a primary local oscillator (LO) that down-converts a received RF signal to a quadrature intermediate frequency (IF) signal; and
- a dithering controller responsive to said quadrature IF signal generated by said primary LO for communicating a feedback signal back to said primary LO, said feedback signal controlling an oscillation frequency of said primary LO, wherein the dithering controller comprises a phase and gain error limit threshold that compares a current phase and gain error to a previous phase and gain error, generates a phase and gain error difference, and generates a step-required output to said LO dithering controller if said phase and gain error difference exceeds a predetermined phase and gain error limit threshold;
- wherein said dithering controller offsets down-conversion of said RF signal by said primary LO from a zero-IF in order to reduce a phase and gain error of said quadrature IF signal.

9. The receiver of claim 8, further comprising a phase and gain error measurement apparatus that measures a phase and gain error of said quadrature IF signal and generates a phase and gain error signal, wherein said dithering controller offsets said primary LO based on said phase and gain error signal.

10. The receiver of claim 9, wherein said dithering controller controls said primary LO to step said quadrature IF signal in response to said phase and gain error signal.

11. The receiver of claim 8, further comprising a memory storing a predetermined step size that steps said primary LO away from a current quadrature IF signal and a predetermined step limit that limits a stepping of said primary LO to a predetermined frequency range.

12. The receiver of claim 8, wherein said dithering controller controls said primary LO to dither said quadrature IF signal according to a predetermined hop sequence.

13. The receiver of claim 8, further comprising a memory storing a predetermined hop sequence that dithers said primary LO over a plurality of hop frequencies.

14. The receiver of claim 8, wherein the dithering controller further comprises:
- a filter bank comprising one or more I signal component filters and one or more Q signal component filters, said filter bank generates a plurality of frequency spectra from said quadrature IF signal;
- an interferer level detector that measures each frequency spectra of said plurality of frequency spectra;
- a frequency discriminator that generates a frequency number for each spectra output from said filter bank;
- a level/frequency threshold including a predetermined power threshold that compares a signal power of each frequency spectra to said predetermined power threshold;
- wherein said level/frequency threshold provides a step-required output to said LO dithering controller if a frequency spectra of said plurality of frequency spectra exceeds said predetermined power threshold.

\* \* \* \* \*